(12) United States Patent
Takei

(10) Patent No.: US 11,996,241 B2
(45) Date of Patent: May 28, 2024

(54) CERAMIC ELECTRONIC COMPONENT, SUBSTRATE ARRANGEMENT AND METHOD OF MANUFACTURING CERAMIC ELECTRONIC COMPONENT

(71) Applicant: TAIYO YUDEN CO., LTD., Tokyo (JP)

(72) Inventor: Shigeto Takei, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 9 days.

(21) Appl. No.: 17/684,555

(22) Filed: Mar. 2, 2022

(65) Prior Publication Data
US 2022/0301781 A1    Sep. 22, 2022

(30) Foreign Application Priority Data

Mar. 16, 2021   (JP) ................ 2021-042307

(51) Int. Cl.
| | |
|---|---|
| H01G 4/30 | (2006.01) |
| H01G 2/06 | (2006.01) |
| H01G 4/012 | (2006.01) |
| H01G 4/12 | (2006.01) |
| H01G 4/224 | (2006.01) |

(52) U.S. Cl.
CPC ............ *H01G 4/30* (2013.01); *H01G 2/065* (2013.01); *H01G 4/012* (2013.01); *H01G 4/1218* (2013.01); *H01G 4/224* (2013.01)

(58) Field of Classification Search
CPC .......... H01G 4/30; H01G 2/065; H01G 4/012; H01G 4/1218; H01G 4/224
See application file for complete search history.

(56) References Cited

U.S. PATENT DOCUMENTS

| | | |
|---|---|---|
| 6,903,919 B2 | 6/2005 | Kayatani et al. |
| 9,653,212 B2 | 5/2017 | Lee et al. |
| 9,758,695 B2 | 9/2017 | Hong et al. |
| 9,818,510 B2 | 11/2017 | Mori et al. |

(Continued)

FOREIGN PATENT DOCUMENTS

JP    2020-21930 A    2/2020

OTHER PUBLICATIONS

U.S. Appl. No. 17/667,431, filed Feb. 8, 2022.

(Continued)

*Primary Examiner* — Michael P McFadden
(74) *Attorney, Agent, or Firm* — CHEN YOSHIMURA LLP

(57) ABSTRACT

A ceramic electronic component includes an element body, two external electrodes, and an oxide layer. The element body includes a dielectric and internal electrodes. The external electrodes are respectively formed to cover, at least partially, two end faces of the element body. Each external electrode includes a base layer and a plating layer. The base layer has a lower part formed on a bottom face of the element body and an end part formed on a corresponding one of the end faces of the element body. The plating layer is formed on at least the lower part of the corresponding base layer. The oxide layer is formed on a predetermined area of a top face of the element body. The oxide layer has a thinner portion in an area on the top face of the element body that is spaced from the end faces of the element body.

20 Claims, 8 Drawing Sheets

(56) References Cited

U.S. PATENT DOCUMENTS

| | | |
|---|---|---|
| 9,818,511 B2 | 11/2017 | Mori et al. |
| 9,978,523 B1* | 5/2018 | Park .................... H01G 4/224 |
| 10,186,367 B2 | 1/2019 | Lee et al. |
| 10,366,834 B1 | 7/2019 | Lee et al. |
| 10,734,142 B2 | 8/2020 | Mori et al. |
| 11,158,455 B2 | 10/2021 | Yoon et al. |
| 11,183,332 B2 | 11/2021 | Kim et al. |
| 11,342,122 B2 | 5/2022 | Masunari |
| 11,600,443 B2 | 3/2023 | Kim et al. |
| 2004/0217445 A1 | 11/2004 | Sakashita et al. |
| 2007/0076348 A1 | 4/2007 | Shioga et al. |
| 2010/0232126 A1* | 9/2010 | Maeda .................... H05K 7/026 361/760 |
| 2010/0290172 A1 | 11/2010 | Motoki et al. |
| 2010/0302704 A1 | 12/2010 | Ogawa et al. |
| 2013/0020913 A1* | 1/2013 | Shirakawa ............. H01G 4/224 336/200 |
| 2014/0085767 A1* | 3/2014 | Kang .................... H01G 13/00 361/301.4 |
| 2015/0016014 A1* | 1/2015 | Park ...................... H01G 2/065 156/89.12 |
| 2015/0084481 A1 | 3/2015 | Mori et al. |
| 2015/0084487 A1* | 3/2015 | Mori .................... H01G 4/248 336/200 |
| 2017/0256359 A1* | 9/2017 | Masunari ............... H01G 4/005 |
| 2017/0367187 A1* | 12/2017 | Chae ...................... H05K 1/181 |
| 2018/0025844 A1* | 1/2018 | Sato ...................... H01G 4/008 361/321.2 |
| 2018/0182550 A1* | 6/2018 | Sasaki .................... H01G 4/232 |
| 2019/0131076 A1* | 5/2019 | Fukumura ............. H01G 4/232 |
| 2019/0346641 A1* | 11/2019 | Schlepple ............. G02B 6/4272 |
| 2019/0385795 A1* | 12/2019 | Yang ...................... H01G 4/30 |
| 2020/0035417 A1 | 1/2020 | Sakurai et al. |
| 2020/0066447 A1* | 2/2020 | Murai .................... H01G 4/30 |
| 2021/0082622 A1 | 3/2021 | Kim et al. |
| 2021/0183581 A1 | 6/2021 | Nakano et al. |
| 2021/0327648 A1 | 10/2021 | Kanzaki et al. |
| 2022/0068566 A1 | 3/2022 | Ikebe et al. |
| 2022/0139616 A1 | 5/2022 | Kang et al. |
| 2022/0172899 A1 | 6/2022 | Lee et al. |
| 2022/0208456 A1 | 6/2022 | Lee et al. |
| 2022/0208457 A1 | 6/2022 | Lee et al. |
| 2022/0301778 A1 | 9/2022 | Suga |
| 2022/0301779 A1 | 9/2022 | Take |

OTHER PUBLICATIONS

U.S. Appl. No. 17/673,666, filed Feb. 16, 2022.
Office Action dated May 10, 2023 in U.S. Appl. No. 17/673,666, which has been cross-referenced to the instant application.

* cited by examiner

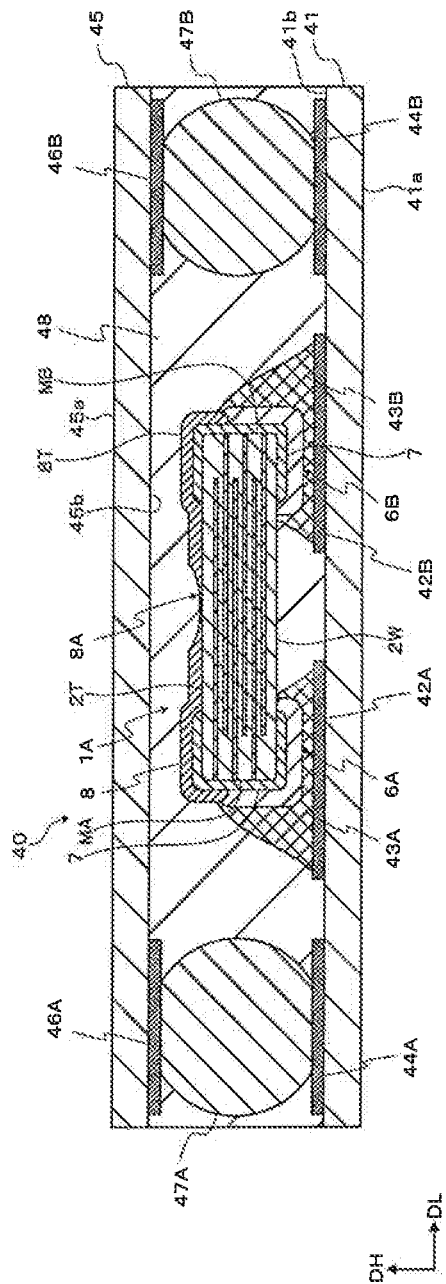

CERAMIC ELECTRONIC COMPONENT, SUBSTRATE ARRANGEMENT AND METHOD OF MANUFACTURING CERAMIC ELECTRONIC COMPONENT

FIELD OF THE INVENTION

The present invention relates to a ceramic electronic component, a substrate arrangement, and a method of manufacturing the ceramic electronic component.

As electronic devices become smaller and more sophisticated, a mounting density of electronic components mounted on a mounting board (substrate) is increasing. In order to reduce the electronic components to be mounted on an ordinary mounting surface, on which IC (Integrated Circuit) chips, etc., are mounted, the height of a multilayer ceramic capacitor is reduced and the multilayer ceramic capacitor is mounted on an surface opposite to the ordinary mounting surface of the substrate. This capacitor may be referred to as an LSC (land-side capacitor).

JP 2020-21930 discloses a multilayer ceramic electronic component, in which an upper terminal electrode is formed on a certain area of an upper surface of an element body of the multilayer ceramic electronic component, and the upper terminal electrode extends to an edge electrode portion. The terminal electrode is not formed on a lower surface of the element body.

SUMMARY OF THE INVENTION

If the configuration disclosed in JP-A-2020-21930 is used and the multilayer ceramic electronic component is mounted on a mounting substrate using solder, the wet solder moves onto the element body over the edge electrode portion. Thus, when the multilayer ceramic electronic component is mounted on a substrate, the solder may become an obstacle against proper mounting of the multilayer ceramic electronic component.

Further, if the element body is made thin in order to reduce the height of the multilayer ceramic capacitor, the rupture strength (bending strength) of the multilayer ceramic capacitor drops, and the multilayer ceramic capacitor often cracks during the mounting of the multilayer ceramic capacitor on a substrate.

An objective of the present invention to provide a ceramic electronic component capable of reducing the height of the ceramic electronic component capable while suppressing the decrease in the bending strength and preventing the solder from wetting up onto the element body. Another objective of the present invention is to provide a method of manufacturing such ceramic electronic component. Still another objective of the present invention is to provide a device that includes a substrate and the ceramic electronic component mounted on the substrate.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purposes of the present invention, as embodied and broadly described, in one aspect, the present disclosure provides a ceramic electronic component that includes an element body, a pair of external electrodes and an oxide layer. The element body includes a dielectric and internal electrodes. The element body has a top face, a bottom face, and a pair of end faces. The two external electrodes are respectively formed to cover, at least partially, the end faces of the element body. Each of the external electrodes includes a base layer and a plating layer. The base layer contains metal. The base layer has a lower part formed on the bottom face of the element body and an end part formed on a corresponding one of the end faces of the element body and connected to one or more of the internal electrodes that are exposed at the corresponding end face. The plating layer is formed on at least the lower part of the corresponding base layer. The oxide layer is formed on a predetermined area of the top face of the element body. The oxide layer has a thinner portion in an area on the top face of the element body that is spaced from the end faces of the element body.

In each of the external electrodes, the plating layer may continuously cover the lower part as well as the end part of the base layer. The oxide layer may continuously cover the top face of the element body and at least portions of the respective end parts of the base layers that are respectively on the end faces of the element body.

The thinner portion of the oxide layer may be a concave portion formed in a central area of the oxide layer on the top face of the element body.

The concave portion may have an arcuate shape.

The concave portion may be located at a position spaced from the external electrodes.

The thinner portion of the oxide layer may be 5% or more thinner than portions of the oxide layer closer to the end faces of the element body.

The oxide layer may meet the plating layers on the respective end faces of the element body.

The plating layer may be absent on or above the top face of the element body, and the oxide layer may also be formed on the base layers formed on the end faces of the element body such that a portion of the oxide layer may be covered with the plating layer on the base layer on each of the end faces.

A thickness of the ceramic electronic component, which is measured from a lower surface of the external electrodes to an upper surface of the oxide layer, may be 150 μm or less.

A main component of the oxide layer may be the same as a main component of the dielectric.

The oxide layer may be made from an oxide ceramic.

The oxide layer may contain one of barium titanate, strontium titanate, calcium titanate, magnesium titanate, barium strontium titanate, barium calcium titanate, calcium zirconate, barium zirconate, calcium zirconate titanate, titanium oxide, silicon oxide and aluminum oxide.

The base layer may also be formed on a portion of the top face of the element body. The oxide layer may be formed on the base layer formed on the portion of the top face of the element body and on a remaining area of the top face of the element body.

The oxide layer may be absent on the plating layer.

The internal electrodes may include at least one first internal electrode layer and at least one second internal electrode layer such that the first internal electrode layer(s) and the second internal electrode layer(s) are alternately laminated via at least one dielectric layer that is the dielectric. The first internal electrode layer(s) may be connected to one of the pair of external electrodes. The second internal electrode layer(s) may be connected to another of the pair of external electrodes.

In another aspect of the invention, the present disclosure provides a device that includes a mounting substrate and the above-described ceramic electronic component. The ceramic electronic is mounted on the mounting substrate via solder layers. The solder layers are adhered to the plating layers of the external electrodes, respectively. The solder layers are wetted up onto the respective external electrode without reaching a top surface of the oxide layer.

The device may further include at least one solder ball provided on a predetermined surface of the first mounting substrate. The ceramic electronic component may be mounted on the predetermined surface of the first mounting substrate.

The device may further include a second mounting substrate. The second mounting substrate may be connected to the first mounting substrate by the solder ball such that spacing is provided between the second mounting substrate and the first mounting substrate and the ceramic electronic component is received in the spacing between the second mounting substrate and the first mounting substrate.

In a third aspect of the invention, the present disclosure provides a method of manufacturing a ceramic electronic component. The method includes forming an element body that includes a dielectric and internal electrodes. The element body has a top face, a bottom face, and a pair of end faces. The method also includes applying a base material for base layers of external electrodes onto the bottom face and the end faces of the element body. The method also includes applying an oxide material for an oxide layer onto the top face of the element body and onto portions of the base material that are on the end faces. Thereafter, the method also includes sintering the base material and the oxide material to form the base layers of the external electrodes and the oxide layer. The base layer of each of the external electrodes has a lower part formed on the bottom face of the element body and an end part formed on one of the end faces of the element body and connected to one or more of the internal electrodes. The oxide layer is formed on the top face of the element body and on at least portions of the end part of the base layers on the end faces. The oxide layer has a thinner portion in an area on the top face of the element body spaced from the end faces of the element body. The method also includes forming plating layers on the base layers, respectively. Each of the plating layers is formed on the lower part and the side part of one of the base layers.

A thickness of the oxide layer and a lower edge of the oxide layer on each of the end faces of the element body may be set such that when the ceramic electronic component is mounted on a substrate by solders, an upper end of the solders that wet up on the respective plating layers on the end faces of the element body is positioned lower than a top surface of the oxide layer.

The ceramic electronic component of the present invention can have a smaller height while suppressing a decrease in a rupture strength, and can prevent wetting up of a solder on the element body.

It is to be understood that both the foregoing general description and the following detailed description are exemplary and explanatory, and are intended to provide further explanation of the invention as claimed.

BRIEF DESCRIPTION OF THE DRAWINGS

FIG. 5 is a cross-sectional view of a substrate arrangement according to a second embodiment of the present invention, which includes a mounting substrate and the multilayer ceramic capacitor of FIG. 2A mounted on the mounting substrate.

DETAILED DESCRIPTION OF THE EMBODIMENTS

Embodiments of the present invention will be described in detail below with reference to the accompanying drawings. The following embodiments do not limit the invention, and not all combinations of features described in the embodiments may be essential to the configuration of the invention. The configurations of the embodiments may be modified or changed as appropriate depending on the specifications of the device to which the invention is applied and various conditions (operating conditions, operating environment, etc.). The scope of the present invention is not limited by the following individual embodiments. The drawings used in the following description may differ in scale and shape from the actual structure for the sake of easier understanding of the illustrated configurations.

First Embodiment

Figure 1:
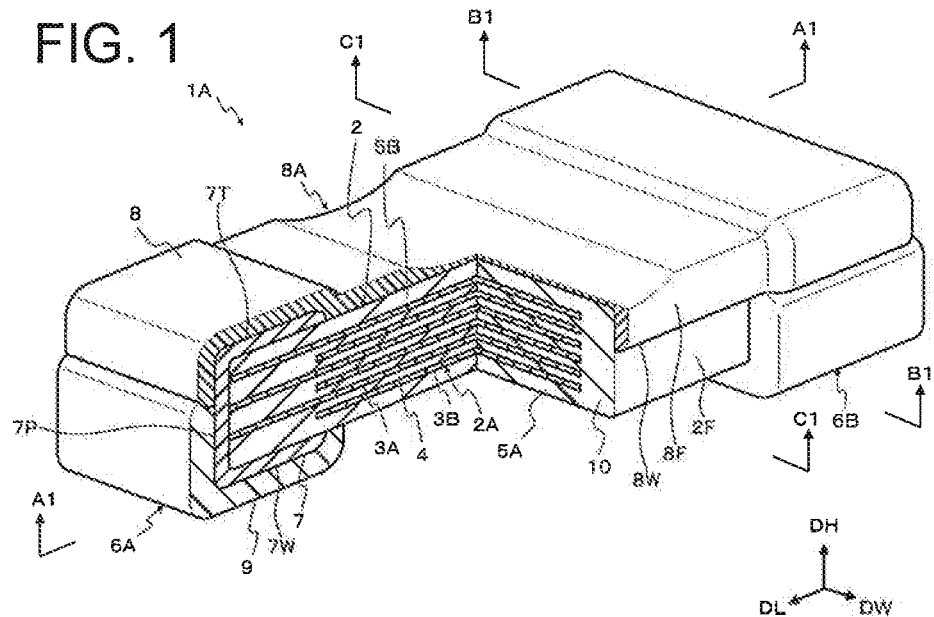
FIG. 1 is a perspective view of a multilayer ceramic capacitor according to a first embodiment of the present invention.
Figure 2A:
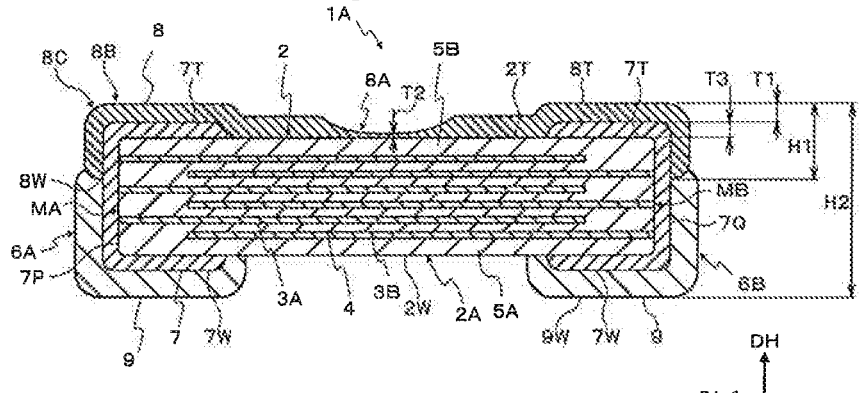
FIG. 2A is a cross-sectional view of the multilayer ceramic capacitor taken along the line A1-A1 in FIG. 1.
Figure 2B:
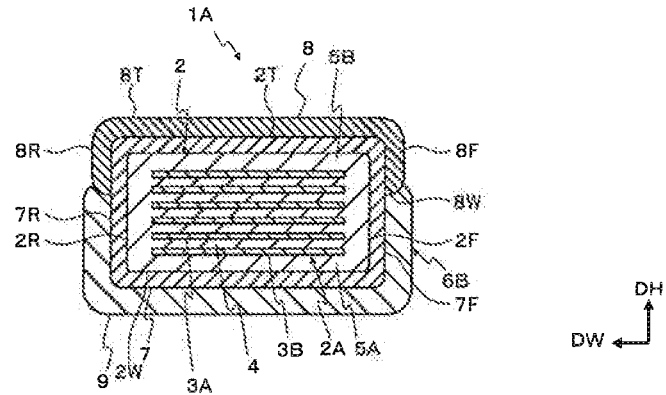
FIG. 2B is a cross-sectional view of the multilayer ceramic capacitor taken along the line B1-B1 in FIG. 1.
Figure 2C:
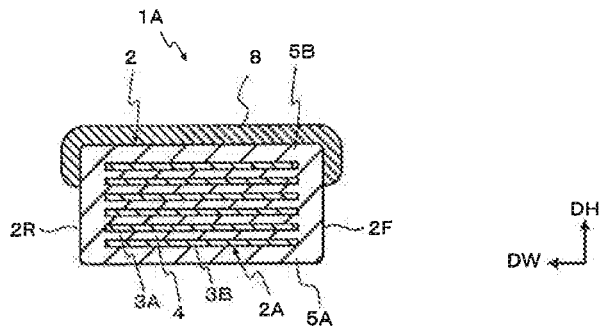
FIG. 2C is a cross-sectional view of the multilayer ceramic capacitor taken along the line C1-C1 in FIG. 1.

FIG. 1 is a perspective view showing an exemplary configuration of a multilayer ceramic capacitor 1A according to a first embodiment of the present invention. FIG. 2A is a cross-sectional view of the multilayer ceramic capacitor 1A taken along the line A1-A1 in FIG. 1. FIG. 2B is a cross-sectional view of the multilayer ceramic capacitor 1A taken along the line B1-B1 in FIG. 1. FIG. 2C is a cross-sectional view of the multilayer ceramic capacitor 1A taken along the line C1-C1 in FIG. 1. In this embodiment, the multilayer ceramic capacitor 1A is an example of a ceramic electronic component.

In FIG. 1 and FIG. 2A to FIG. 2C, the multilayer ceramic capacitor 1A includes an element body 2, an external electrode (outer electrode) 6A, another external electrode (outer electrode) 6B and an oxide layer 8. The element body 2 includes a laminate 2A, a lower cover layer 5A, and an upper cover layer 5B. The laminate 2A includes inner electrode layers (internal electrodes) 3A and 3B and dielectric layers 4. The element body 2 has six faces, i.e., a left face MA, a right face MB, a top face 2T, a bottom face 2W, a front face 2F and a rear face 2R. The left face MA of the element body 2 may be referred to a left end face, and the right face MB may be referred to as a right end face. The front face 2F may be referred to as a first lateral face and the rear face 2R may be referred to as a second lateral face. The top face 2T is perpendicular to the end faces MA and MB. The bottom face 2W is also perpendicular to the end faces MA and MB.

The lower cover layer 5A is provided below the laminate 2A, and the upper cover layer 5B is provided on top of the laminate 2A. The internal electrode layers 3A and 3B are alternately stacked via the dielectric layers 4. The internal electrode layers 3A are exposed in the left end face MA of the element body 2, and the internal electrode layers 3B are exposed in the right end face MB. Although FIG. 1 and FIGS. 2A to 2C show a configuration in which the six internal electrode layers 3A and 3B are stacked, the number of stacked internal electrode layers 3A and 3B is not limited to six. The shape of the element body 2 may be a generally rectangular parallelepiped and the shape of the laminate 2A may also be a generally rectangular parallelepiped. The element body 2 may be chamfered along the ridge lines of the element body 2.

In the following description, the longitudinal direction of the element body 2 is the normal direction of the side faces MA and MB of the element body 2 and designated by DL. The length direction DL is the right-left direction in FIG. 1. The two opposite surfaces of the element body 2 in the length direction DL are the left face MA and the right face MB of the element body 2. The width direction of the element body 2 is designated by DW. The height direction of the element body 2 is designated by DH and may be referred to as the stacking direction DH. The height direction DH may be referred to as a thickness direction of the element body 2. The inner electrode layers 3A and 3B are laminated in the height direction DH with the dielectric layers 4 being interposed between the inner electrode layers 3A and 3B.

The multilayer ceramic capacitor 1A is mounted on a mounting substrate 41 (FIG. 5) and is used to remove noises or the like applied to a semiconductor chip mounted on the mounting substrate 41.

The external electrodes 6A and 6B are formed on the element body 2 such that the external electrodes 6A and 6B are separated from each other in the length direction DL and situated at the opposite ends of the element body 2 in the length direction DL. The left external electrode 6A is formed on the left end face MA of the element body 2 and may extend onto the three adjacent faces (i.e., the top face 2T, the bottom face 2W, the front face 2F and the rear face 2R) of the element body 2 from the left end face MA of the element body 2. The right external electrode 6B is formed on the right end face MB of the element body 2 and may extend onto the four adjacent faces (i.e., the top face 2T, the bottom face 2W, the front face 2F and the rear face 2R) of the element body 2 from the right end face MB of the element body 2.

In the length direction DL of the element body 2, the internal electrode layers 3A and 3B are alternately arranged at different positions in the laminate 2A. Specifically, when compared to the internal electrode layers 3B, the internal electrode layers 3A are arranged on the left end side of the element body 2, i.e., the internal electrode layers 3A extend in the length direction DL from the left end face MA of the element body toward the right end face MB. The internal electrode layers 3B are arranged on the right end side of the element body 2, i.e., the internal electrode layer 3B extend in the length direction DL from the right end face MB toward the left end face MA. The left end of each of the internal electrode layers 3A is exposed in the left end face MA of the element body 2 and is connected to the external electrode 6A. The right end of each of the internal electrode layers 3B is exposed in the right end face MB of the element body 2 and is connected to the external electrode 6B.

In the width direction DW of the element body 2, the ends of the inner electrode layers 3A and 3B are covered with the dielectric layers 4. In the width direction DW, the ends of the inner electrode layers 3A and 3B may be aligned with each other as shown in FIG. 2B. The element body 2 has two margins 10 that cover the inner electrode layers 3A and 3B in the width direction DW.

The thickness of each of the internal electrode layers 3A and 3B and dielectric layers 4 in the stacking direction DH may be within the range from 0.05 μm to 5 μm, respectively. For example, the thickness of the internal electrode layer 3A is 0.3 μm, the thickness of the internal electrode layer 3B is 0.3 μm, and the thickness of the dielectric layer 4 is 0.3 μm. The main material of the inner electrode layers 3A and 3B may be, for example, a metal such as Cu (copper), Ni (nickel), Ti (titanium), Ag (silver), Au (gold), Pt (platinum), Pd (palladium), Ta (tantalum) or W (tungsten), or may be an alloy containing these metals.

The main component of the material of the dielectric layer 4 may be, for example, a ceramic material that has a perovskite structure. The main component may be contained 50 at % or more. The ceramic material of the dielectric layer 4 may be, for example, barium titanate, strontium titanate, calcium titanate, magnesium titanate, strontium barium titanate, calcium barium titanate, calcium zirconate, barium zirconate, calcium zirconate titanate or titanium oxide.

The main component of the material of each of the lower cover layer 5A and the upper cover layer 5B may be, for example, a ceramic material. The main component of the ceramic material of each of the lower cover layer 5A and the upper cover layer 5B may be the same as the main component of the ceramic material of the dielectric layer 4.

Each of the external electrodes 6A and 6B has a base layer (underlayer) 7 formed on the element body 2 and a plating layer 9 formed on the base layer 7. The base layers 7 are formed on the left end face MA and the right end face MB of the element body 2 so that they are separated from each other in the length direction DL. Specifically, the left base layer 7 is formed the left end face MA of the element body 2 and extends onto the four adjacent faces 2T, 2W, 2R and 2F of the element body 2. Similarly, the right base layer 7 is formed on the right end face MB of the element body 2 and extends onto the four adjacent faces 2T, 2W, 2R and 2F of the element body 2. The left base layer 7 is connected to the internal electrode layers 3A. The right base layer 7 is connected to the internal electrode layers 3B.

The left plating layer 9 is formed on certain areas of the left base layer 7. Specifically, the left plating layer 9 is formed on a left end face 7P, a bottom face 7W, a front face 7F and a rear face 7R of the left base layer 7. The left plating layer 9 is not formed on an upper face 7T of the base layer 7. The right plating layer 9 is formed on certain areas of the right base layer 7. Specifically, the right plating layer 9 is formed on a right end face 7Q, a bottom face 7W, a front face 7F and a rear face 7R of the right base layer 7. The right plating layer 9 is not formed on the upper face 7T of the right base layer 7. The upper end of the left plating layer 9 which is present on the left end face 7P, the front face 7F and the rear face 7R of the left base layer 7 is lower than the upper face 2T of the element body 2. An upper portion of the left base layer 7 is exposed from the left plating layer 9. The upper end of the right plating layer 9 which is present on the right end face 7Q, the front face 7F and the rear face 7R of the right base layer 7 is lower than the upper face 2T of the element body 2. An upper portion of the right underlayer 7 is exposed from the right plating layer 9. The thickness T4 of each of the external electrodes 6A and 6B on the bottom face 2W of the element body 2 is, for example, in the range from 10 μm to 40 μm.

The main component of the metal used as the conductive material of the base layer 7 may contain at least one of, for example, Cu, Fe (iron), Zn (zinc), Al (aluminum), Ni, Pt, Pd, Ag, Au and Sn (tin) or may contain an alloy that includes at least one of these metals. The base layer 7 may include a co-material which is mixed with the metal(s) of the base layer. The co-material may be present in the form of a plurality of islands in the base layer 7. If the co-material is present in the base layer 7 in the form of the islands, the co-material can reduce the difference in the thermal expansion coefficient between the element body 2 and the base layer 7, and can alleviate the stress on the base layer 7. The co-material is, for example, the ceramic component, which is the main component of the dielectric layer 4. The base layer 7 may contain a glass component. If the glass component is mixed in the base layer 7, the glass component can densify the base layer 7. This glass component is, for example, an oxide of Ba (barium), Sr (strontium), Ca (calcium), Zn, Al, Si (silicon) or B (boron).

The base layer 7 may contain a metal component that is included in the element body 2. This metal component is, for example, Mg, and a trace amount of Ni, Cr, Sr, Al, Na and/or Fe may be included in this metal component. The base layer 7 may include, for example, a compound containing Mg, Ni and O as a compound of the metal used as the conductive material of the base layer 7, the metal contained in the element body 2 and oxygen.

The main component of the material of the plating layer 9 may be a metal such as Cu, Ni, Al, Zn or Sn, or an alloy made from two or more of these metals. The plating layer 9 may have a single-layer structure that includes a single metal component or a multi-layer structure that includes a plurality of plating layers of different metal components. For example, the plating layer 9 has a three-layer structure consisting of a Cu plating layer formed on the base layer 7, a Ni plating layer formed on the Cu plating layer, and a Sn plating layer formed on the Ni plating layer. The Cu plating layer can enhance the adhesiveness of the plating layer 9 to the base layer 7. The Ni plating layer can increase the thermal resistance of the external electrode 6A, 6B during soldering. The Sn plating layer can improve the wettability of the solder to the plating layer 9. The left plating layer 9 is formed on certain areas of the left base layer 7 and is electrically connected to the inner electrode layers 3A. The right plating layer 9 is formed on certain areas of the right base layer 7 and is electrically connected to the inner electrode layers 3B. The plating layers 9 are electrically connected to terminals 42A and 42B (FIG. 5) of the mounting substrate 42 (FIG. 5) through solder layers 43A and 43B (FIG. 5). A lower surface of each of the plating layers 9 is denoted by 9W. The lower surface 9W of the plating layer 9 is the lower surface of the outer electrode 6A, 6B.

The oxide layer 8 is formed on the upper portion of the left end face 7P of the left base layer 7, which is not covered with the left plating layer 9, and extends over the top face 7T of the left base layer 7 and the top face 2T of the element body 2. The oxide layer 8 also extends on the upper portion of the front face 7F and the upper portion of the rear face 7R of the left base layer 7. The oxide layer 8 also extends on the top face 7T of the right base layer 7 and the upper portion of the right end face 7Q of the right base layer 7. The oxide layer 8 also extends on an upper portion of the front face 2F and an upper portion of the rear face 2R of the element body 2. The oxide layer 8 also extends on the upper portion of the front face 7F and the upper portion of the rear face 7R of the right base layer 7. The oxide layer 8 is not formed on the lower face 2W of the element body 2. The lower end (lower edge) 8W of the oxide layer 8, which is present on the left end face 7P, the front face 7F and the rear face 7R of the left base layer 7, the right end face 7Q, the front face 7F and the rear face 7R of the right base layer 7, and the front face 2F and the rear face 2R of the element body 2, is higher than the lower face 2W of the element body 2.

The oxide layer 8 contacts the left plating layer 9 on the left base layer 7. Specifically, the oxide layer 8 contacts (meets) the left plating layer 9 on the front face 7F, the left face 7P and the rear face 7R of the left base layer 7. Similarly, the oxide layer 8 contacts the right plating layer 9 on the right base layer 7. Specifically, the oxide layer 8 contacts the right plating layer 9 on the front face 7F, the right face 7Q and the rear face 7R of the right base layer 7. The height H1 of the oxide layer 8, which is measured from the top surface 8T of the oxide layer 8 to the lower edge 8W, may be 10 μm or more, and may not exceed a half of the height H2 of the multilayer ceramic capacitor 1A. The height H2 of the multilayer ceramic capacitor 1A is measured from the top surface 8T of the oxide layer 8 to the lower face 9W of the outer electrode 6A, 6B. The lower edge 8W and its vicinity of the oxide layer 8 on the left base layer 7 are covered with the left plating layer 9. The lower edge 8W of the oxide layer 8 on the left base layer 7 may be wedged between the left base layer 7 and the left plating layer 9. Similarly, the lower edge 8W and its vicinity of the oxide layer 8 on the right base layer 7 are covered with the right plating layer 9. The lower edge 8W of the oxide layer 8 on the right base layer 7 may be wedged between the right base layer 7 and the right plating layer 9. The surface roughness Ra of the oxide layer 8 may be equal to or greater than 0.20 μm. As shown in FIG. 2A, the oxide layer 8 bends downward from the top surfaces 7T of the base layers 7. Thus, the height H1 of the oxide layer 8 may be referred to as an amount of wrapping-around or downward bending of the oxide layer 8.

The oxide layer 8 has a thinner portion 8A in a certain area of the oxide layer 8 on the upper surface 2T of the element body 2. In the illustrated embodiment, the thinner portion 8A is formed in a center area of the top surface 8T of the oxide layer 8. The thickness of the oxide layer 8 is, therefore, greater in outer areas 8B than in the center area 8A. As shown in FIG. 1, the thinner portion 8A extends in the width direction DW. It should be noted that the thinner portion 8A may also be formed in a center area of the front face 8F of the oxide layer 8 on the element body 2 and/or the rear face 8R of the oxide layer 8 on the element body 2. In other words, the thinner portion 8A extending in the width direction DW may also extend downward along the front face 2F and/or the rear face 2R of the element body 2. The thinner portion 8A is a concave portion (recess) of the oxide layer 8. The thinner portion 8A may have a curved surface. As shown in FIG. 2A, the curved surface has a certain radius of curvature. The radius of curvature of the thinner portion 8A is preferably greater than the radius of the corner portion 8C of the oxide layer 8. For example, the concave portion 8A formed in the center area of the oxide layer 8 may have an arcuate shape. The thickness T1 of the oxide layer 8 is preferably between 1 μm and 15 μm. It is preferable that the thickness T2 of the thinner portion 8A of the oxide layer 8 is 5% or more thinner than the thickness T1 of the end portion of the oxide layer 8. For example, the thickness T2 of the central portion 8A of the oxide layer 8 may be about 2 μm, and the thickness T1 of the end portion of the oxide layer 8 may be between 5 μm and 15 μm. The element body 2 may be exposed at the position of the concave portion 8A of the oxide layer 8. In this configuration, the oxide layer 8 need not be contiguous between the outer electrodes 6A and 6B. The oxide layer 8 may be separated into two segments. The main component of the oxide layer 8 may be the same as the main component of the dielectric layer 4. For example, the main component of the oxide layer 8 may be an oxide ceramic. T3 denotes the thickness of the underlayer 7. The thickness T3 of the underlayer 7 may be the same on the top surface 2T, the end face MA, MB and the bottom face 2W of the element body 2.

The size of the multilayer ceramic capacitor 1A may satisfy the relation of length>width>height, or the relation of length>width=height. In order to reduce the height of the multilayer ceramic capacitor 1A, the height H2 of the multilayer ceramic capacitor 1A is preferably 150 μm or less. As mentioned earlier, the height H2 of the multilayer ceramic capacitor 1A is the thickness of the multilayer ceramic capacitor 1A from the bottom surface 9W of the outer electrode 6A (6B) to the top surface 8T of the oxide layer 8.

Because the oxide layer 8 having the concave portion 8A is formed in the center area of the upper surface 8T of the oxide layer 8 on the top surface 2T of the element body 2, it is possible to reduce the height of the multilayer ceramic capacitor 1A while suppressing a decrease in the transverse rupture strength of the multilayer ceramic capacitor 1A. The decrease in the transverse rupture strength of the multilayer ceramic capacitor 1A is small because the element body 2 can have a relatively large thickness. The element body 2 can have a relatively large thickness because the outer electrodes 6A and 6B are not formed on the top surface 2T of the element body 2. The height reduction of the multilayer ceramic capacitor 1A is achieved because the oxide layer 8 is very thin. In addition, it is possible to prevent wetting up of the solder when the multilayer ceramic capacitor 1A is mounted on the substrate 41. Therefore, it is possible to suppress or avoid cracking of the multilayer ceramic capacitor 1A during the mounting of the multilayer ceramic capacitor 1A on the substrate 41 while realizing the LSC mounting of the multilayer ceramic capacitor 1A.

If the height H2 of the multilayer ceramic capacitor 1A is equal to or smaller than 150 μm, the height of the multilayer ceramic capacitor 1A can be made smaller than the diameter of a solder ball 47A, 47B (FIG. 5). The solder balls are used to mount the mounting substrate 41 (FIG. 6) of the multilayer ceramic capacitor 1A on a motherboard 45 (FIG. 5). The multilayer ceramic capacitor 1A is placed on a predetermined face of the mounting substrate, and the solder balls are provided on the same face of the mounting substrate. As a result, it is possible to mount the mounting substrate of the multilayer ceramic capacitor 1A onto the motherboard with the solder balls while mounting the multilayer ceramic capacitor 1A on the predetermined face of the mounting substrate which has the solder balls thereon. Thus, the multilayer ceramic capacitor 1A may be placed on the predetermined face (e.g., a rear face) of the mounting substrate and one or more semiconductor chips may be placed on the opposite face (e.g., a front face) of the mounting substrate. Accordingly, the multilayer ceramic capacitor 1A can be mounted in close proximity to the semiconductor chip(s). This makes it possible to effectively eliminate noises added to the semiconductor chips.

The main component of the oxide layer 8 may be the same as the main component of the dielectric layer 4. In this configuration, even when the underlayers 7, the element body 2 and the oxide layer 8 are produced by sintering, the stress applied to the oxide layer 8 can be relaxed. Thus, it is possible to improve the adhesion of the oxide layer 8 to the element body 2 and the underlayers 7.

Figure 3:
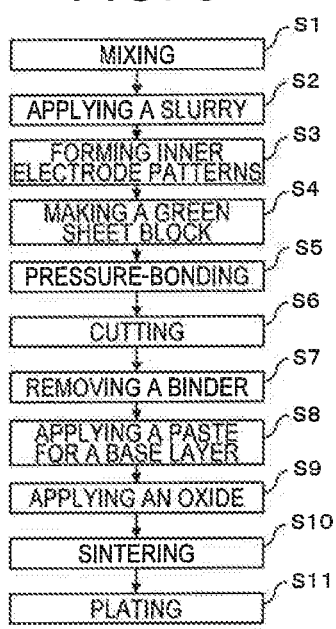
FIG. 3 is a flowchart showing a method of manufacturing the multilayer ceramic capacitor shown in FIG. 1.

FIG. 3 is a flowchart showing a method of manufacturing the multilayer ceramic capacitor 1A according to the first embodiment. FIG. 4A to FIG. 4I are a series of cross-sectional views showing the method of manufacturing the multilayer ceramic capacitor 1A. In FIG. 4I to FIG. 4C, it should be noted that for the sake of description and understanding, the three inner electrode layers 3A and the three inner electrode layers 3B are alternately stacked in the thickness direction DH of the capacitor 1A, with the dielectric layers 4 being interposed between the inner electrode layers 3A and 3B.

In Step S1 of FIG. 3, an organic binder and an organic solvent as a dispersant and a forming aid are added to a dielectric material powder, and pulverized and mixed to produce a slurry. The dielectric material powder includes, for example, a ceramic powder. The dielectric material powder may contain an additive or additives. The additive(s) may be, for example, an oxide of Mg (magnesium), Mn (manganese), V (vanadium), Cr (chromium), Y (yttrium), Sm (samarium), Eu (europium), Gd (cadmium), Tb (terbium), Dy (dysprosium), Ho (holmium), Er (erbium), Tm (thulium), Yb (ytterbium), Co (cobalt), Ni, Li (lithium), B, Na (sodium), K (potassium) or Si, or glass. The organic binder is, for example, polyvinyl butyral resin or polyvinyl acetal resin. The organic solvent is, for example, ethanol or toluene.

Figure 4A:
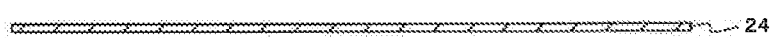
FIG. 4A is a cross-sectional view useful to describe the manufacturing process of the multilayer ceramic capacitor according to the first embodiment.

Next, as indicated in Step S2 of FIG. 3 and shown in FIG. 4A, a green sheet 24 is prepared. Specifically, the slurry containing the ceramic powder is applied onto a carrier film in a sheet form and dried to manufacture the green sheet 24. The carrier film is, for example, a PET (polyethylene terephthalate) film. A doctor blade method, a die coater method or a gravure coater method may be used to apply the slurry onto the carrier film. Step S2 is repeated to prepare a plurality of green sheets 24.

Figure 4B:
FIG. 4B is another cross-sectional view useful to describe the manufacturing process of the multilayer ceramic capacitor according to the first embodiment.
Figure 4C:
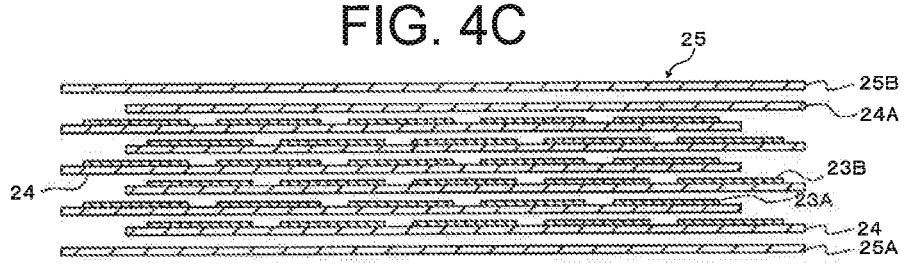
FIG. 4C is still another cross-sectional view useful to describe the manufacturing process of the multilayer ceramic capacitor according to the first embodiment.

Next, as indicated in Step S3 of FIG. 3 and shown in FIG. 4B, a conductive paste, which will become the internal electrode, is applied in a predetermined pattern onto each of those green sheets 24, which will become the internal electrode layers 3A and 3B, among the green sheets prepared in Step S1 to form a plurality of internal electrode patterns 23 on that green sheet 24. In Step 3, it is possible to form a plurality of internal electrode patterns 23 on the single green sheet 24 such that the internal electrode patterns 23 are separated from each other in the longitudinal direction of the green sheet 24. The conductive paste for the internal electrode includes a powder of the metal used as the material of the internal electrode layers 3A and 3B. For example, if the metal used as the material of the internal electrode layers 3A and 3B is Ni, the conductive paste for the internal electrode contains a Ni powder. Further, the conductive paste for the internal electrode includes a binder, a solvent, and, if necessary, an auxiliary agent. The conductive paste for the internal electrode may contain, as a co-material, a ceramic material which is the main component of the dielectric layers 4. The application of the conductive paste for the internal electrode may be carried out by a screen printing method, an ink jet printing method or a gravure printing method. Thus, Step S3 may be referred to as a printing step. In this manner, a plurality of green sheets 24 that have the inner electrode patterns 23 thereon are prepared.

Next, as indicated in Step S4 of FIG. 3 and shown in FIG. 4C, the green sheets 24 on which the internal electrode patterns 23 are formed and the green sheets 24A, 25A and 25B on which the internal electrode patterns 23 are not formed are laminated in a predetermined order to create a block 25 of the green sheets 24. The green sheets 25A and 25B on which the internal electrode patterns 23 are not formed are used as outer layers (i.e., the bottom layer and the top layer). In Step S4, the green sheets 24 having the internal electrode patterns 23 thereon are divided into two groups, i.e., the green sheets 24 having the internal electrode patterns 23A thereon and the green sheets 24 having the internal electrode patterns 23B thereon. Then, the green sheets 24 having the internal electrode patterns 23A thereon and the green sheets 24 having the internal electrode patterns 23B thereon are stacked alternately in the laminating direction such that the internal electrode patterns 23A on the green sheet 24 and the internal electrode patterns 23B on the next or adjacent green sheet 24 are alternately shifted in the longitudinal direction of the green sheet 24. Further, three types of portions are defined in the green sheet block 25. Specifically, a portion where only the internal electrode patterns 23A are stacked in the stacking direction, a portion where the internal electrode patterns 23A and 23B are stacked alternately in the stacking direction, and a portion where only the internal electrode patterns 23B are stacked in the stacking direction are defined the green sheet block 25. The thickness of the green sheet 25A, 25B may be greater than the thickness of the green sheet 24 on which the internal electrode patterns 23 are formed.

Figure 4D:
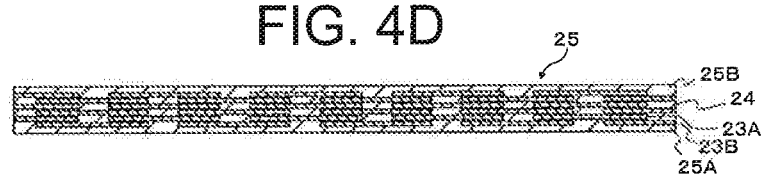
FIG. 4D is yet another cross-sectional view useful to describe the manufacturing process of the multilayer ceramic capacitor according to the first embodiment.

Next, as indicated in Step S5 of FIG. 3 and shown in FIG. 4D, the laminate block 25 obtained in the forming process of Step S4 of FIG. 3 is pressed such that the green sheets 24, 24A, 25A and 25B are pressure-bonded. Pressing the laminate block 25 may be carried out by, for example, sandwiching the laminate block 25 between resin films, and hydrostatically pressing the laminate block 25.

Figure 4E:
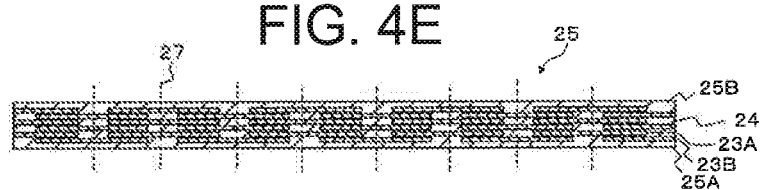
FIG. 4E is another cross-sectional view useful to describe the manufacturing process of the multilayer ceramic capacitor according to the first embodiment.

Next, as indicated in Step S6 of FIG. 3 and shown in FIG. 4E, the pressed laminate block 25 is cut such that the block 25 is separated to a plurality of element bodies, each of which has a rectangular parallelepiped shape. Each element body has six surfaces. The cutting of the laminate block 25 is carried out at the portions where only the inner electrode patterns 23A are present in the stacking direction, and the portions where only the inner electrode patterns 23B are present in the stacking direction, as indicated by a plurality of vertical broken lines 27. The cutting of the laminate block 25 is carried out by, for example, blade dicing or a similar method. The resulting element bodies 2 are shown in FIG. 4F.

Figure 4F:
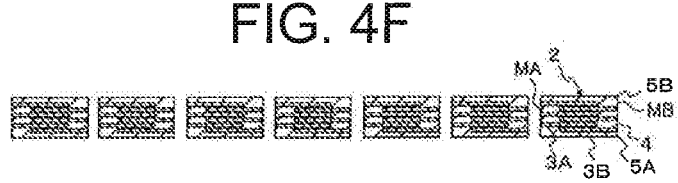
FIG. 4F is another cross-sectional view useful to describe the manufacturing process of the multilayer ceramic capacitor according to the first embodiment.

As shown in FIG. 4F, the internal electrode layers 3A and 3B are alternately laminated via the dielectric layers 4 in each of the individual element bodies 2, with the upper cover layer 5A becoming the top layer and the lower cover layer 5B becoming the bottom layer. The internal electrode layers 3A are exposed on the left face MA of each element body 2, and the internal electrode layers 3B are exposed on the right face MB of each element body 2.

Next, as shown in Step S7 of FIG. 3, the binder contained in each of the element bodies 2 obtained in Step S6 of FIG. 3 is removed. The removal of the binder is carried out by, for example, heating the element bodies 2 in an $N_2$ atmosphere at about 350 degrees C.

Figure 4G:
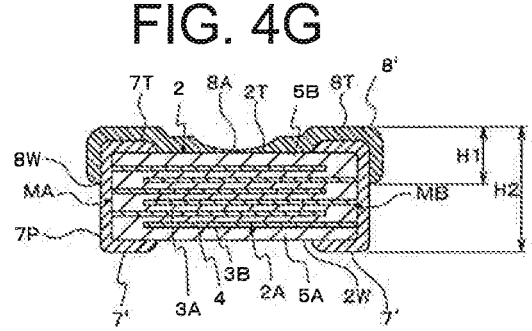
FIG. 4G is another cross-sectional view useful to describe the manufacturing process of the multilayer ceramic capacitor according to the first embodiment.

Next, as indicated in Step S8 of FIG. 3 and shown in FIG. 4G, a conductive paste for the base layer (underlayer) 7' is applied to the two side surfaces MA and MB of each element body 2 which has undergone the binder removal of Step S7 of FIG. 3 and to the end areas of the remaining four surfaces (top surface 2T, the bottom surface 2W, the front surface 2F and the rear surface 2R) of the element body 2 which are in contact with the respective side surfaces MA and MB. Then, the conductive paste 7' is dried. A dipping method may be used to apply the conductive paste 7'. The conductive paste 7' includes a powder or filler of the metal used as the conductive material of the base layer 7. For example, when the metal used as the conductive material of the base layer 7 is Ni, the conductive paste 7' includes a powder or filler of Ni. Further, the conductive paste 7' includes, as a co-material, a ceramic component, which is the main component of the dielectric layers 4, for example. Particles of oxide ceramics mainly composed of barium titanate (0.8 μm to 4 μm in D50 particle diameter), for example, are mixed in the conductive paste 7', as the co-material. Further, the conductive paste 7' includes a binder and a solvent.

Next, as indicated in Step S9 of FIG. 3 and shown in FIG. 4G, an oxide paste 8' is applied over the upper surface 7T of each of the conductive pastes 7' and the upper surface 2T of the element body 2 such that the paste 8' also extends onto the front face 7F, the rear face 7R and the side faces 7P and 7Q of the underlayers 7' and the front face 2F and the rear face 2R of the element body 2. The oxide paste 8' is then dried. The oxide paste 8' includes a powder or filler of an oxide used for the oxide layer 8. For example, the oxide paste 8' includes a ceramic component which is the main component of the dielectric layer 4. For example, particles of an oxide ceramic, which contains barium titanate as its main component, are mixed in the oxide paste 8'. Alternatively, the main component of the oxide contained in the oxide paste 8' may be an oxide such as silicon oxide or aluminum oxide rather than barium titanate. The oxide paste 8' includes a binder and a solvent. Thus, the main component of the resulting oxide layer 8 may be one of barium titanate, strontium titanate, calcium titanate, magnesium titanate, barium strontium titanate, barium calcium titanate, calcium zirconate, barium zirconate, calcium zirconate titanate, titanium oxide, silicon oxide and aluminum oxide.

The oxide paste 8' may be applied by, for example, a dipping method. If the dipping method is employed, the depth of the dipping may be controlled such that the height H1 of the resulting oxide layer 8 from the upper surface 8T of the oxide layer 8 to the lower edge 8W of the oxide layer 8 becomes between 10 μm and a half of the height H2 of the multilayer ceramic capacitor 1A. As described later, the oxide paste 8' will be sintered and become the oxide layer 8.

An amount of the oxide contained in the oxide paste 8' is adjusted such that the surface roughness Ra of the oxide layer 8, which has undergone the sintering process, is equal to or greater than 0.20 μm, the thickness T1 of the oxide layer 8 is between 1 μm and 15 μm, and the thickness T2 of the central portion (concave portion) 8A of the oxide layer 8 is 5% or more thinner than the thickness T1. It should be noted that in order to adjust the surface roughness Ra of the oxide layer 8 and the thickness T2 of the concave portion 8A of the oxide layer 8, not only an amount of the oxide included in the oxide paste 8' but also particle size and/or shape the oxide included in the oxide paste 8' may be adjusted. Further, in order to adjust the surface roughness Ra of the oxide layer 8 and the thickness T2 of the central portion 8A of the oxide layer 8, parameters of a process for drying the oxide paste 8', such as the drying speed, the drying temperature and the drying time, may be adjusted. In order to make the thickness T2 of the central portion 8A of the oxide layer 8 smaller than the thickness T1 of the end portions of the oxide layer 8, the oxide paste 8' may be repeatedly applied to end areas of the top surface 2T of the element body 2 and to the underlayers 7. A screen printing method, an inkjet printing method, a gravure printing method, or the like may be used to apply the oxide paste 8' to the end areas of the top surface 2T of the element body 2 and to the underlayers 7.

Figure 4H:
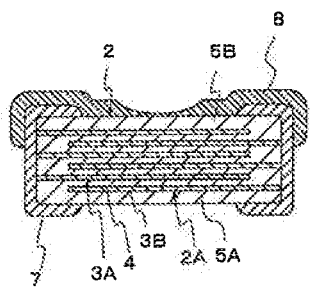
FIG. 4H is another cross-sectional view useful to describe the manufacturing process of the multilayer ceramic capacitor according to the first embodiment.
Figure 4I:
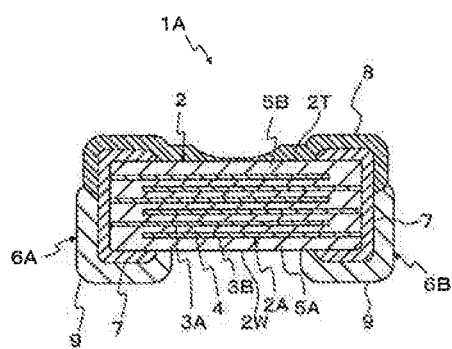
FIG. 4I is another cross-sectional view useful to describe the manufacturing process of the multilayer ceramic capacitor according to the first embodiment.

Next, as indicated in Step S10 of FIG. 3 and shown in FIG. 4H, the element bodies 2, on which the conductive paste 7' for the underlayers and the conductive paste 8' for the base layers are applied, undergo the sintering process such that the inner electrode layers 3A and 3B are integrated with the dielectric layers 4 in each element body 2, the base layers 7 are integrated with the element body 2, and the oxide layer 8 is integrated with the element body 2 and the base layers 7. The sintering of the element bodies 2, the conductive plate 7' for the base layers 7 and the conductive layer 8' for the oxide layer 8 is carried out in, for example, a sintering furnace in a temperature range from 1000 degrees C. to 1400 degrees C. for ten minutes to two hours. If a base metal such as Ni or Cu is used as the material of the internal electrode layers 3A and 3B, the sintering process may be carried out in the sintering furnace while the interior of the sintering furnace is kept to a reducing atmosphere in order to prevent the oxidation of the internal electrode layers 3A and 3B. In order to adjust the surface roughness and thickness of the oxide layer 8, the surface of the oxide layer 8 may be ground or polished after sintering the oxide paste 8'.

Next, as indicated in Step S11 of FIG. 3 and shown in FIG. 4I, a plating process is carried out. Specifically, a plating layer 9 is formed on each of the base layers 7 which are not covered with the oxide layer 8. In the process of forming the plating layer 9, for example, Cu plating, Ni plating and Sn plating may be sequentially performed. In this process, the element body 2 on which the base layers 7 and the oxide layer 8 are formed is placed in a barrel together with the plating solution, and the electricity is supplied to the barrel while rotating the barrel, so as to form the plating layers 9. Since the oxide layer 8 is present on the upper portions of the underlayers 7, the plating layers 9 are not formed on the upper portions of the underlayers 7.

In this embodiment, since the oxide paste 8' is applied over the element body 2 and the underlying layers 7 by the dipping method, it is possible to reduce the manufacturing processes of the multilayer ceramic capacitor 1A and it is also possible for the oxide layer 8 to have desired values of the thickness T1 and T2, the height H1 and the surface roughness Ra while satisfying other conditions with regard to the formation of the oxide layer 8.

Second Embodiment

A second embodiment of the invention will be described with reference to FIGS. 5, 6A and 6B. FIG. 5 is a cross-sectional view showing a configuration example of a device 40 that includes the mounting board 41 and the multilayer ceramic capacitor 1A mounted on the board 41. Same or similar reference numerals are used to designate same or similar parts in the first and second embodiments.

In this embodiment, the multilayer ceramic capacitor 1A of the first embodiment is mounted on a lower mounting substrate 41, and a combination of the capacitor 1A and the lower mounting substrate 41 is mounted on an upper mounting substrate 45. A combination of the capacitor 1A and the lower mounting substrate 41 may be referred to as a substrate arrangement 40. The upper mounting substrate 45 may be referred to as a motherboard. The lower mounting substrate 41 has an outer face 41a and an inner face 41b. The inner face 41b may be referred to as a back face 41b. The upper mounting substrate 45 has an outer face 45a and an inner face 45b. The inner face 45b may be referred to as a back face 45b.

In FIG. 5, four land electrodes 42A, 42B, 44A and 44B are formed on the back face 41b of the mounting substrate 41. The multilayer ceramic capacitor 1A is connected to the land electrodes 42A and 42B through the solder layers 43A and 43B, respectively, which are attached to the plating layers 9 of the external electrodes 6A and 6B. The solder layer 43A wets up to the left surface of the external electrode 6A but does not reach the top surface 8T of the oxide layer 8. The solder layer 43B wets up to the right surface of the external electrode 6B but does not reach the top surface 8T of the oxide layer 8. Thus, the upper ends of the solder layers 43A and 43B are lower than the top surface 8T of the oxide layer 8. Solder balls 47A and 47B are formed on the land electrodes 44A and 44B disposed on the back face 41b of the mounting substrate 41, respectively.

It should be noted that although not illustrated in FIG. 5, one or more semiconductor chips are mounted on the outer face 41a of the mounting substrate 41. The semiconductor chip(s) may include a microprocessor, a semiconductor memory, an FPGA (Field-Programmable Gate Array) and/or an ASIC (Application Specific Integrated Circuit).

Land electrodes 46A and 46B are formed on the back face 45b of the upper mounting substrate 45. The upper mounting substrate 45 is connected to the lower mounting substrate 41 via the solder balls 47A and 47B. The substrate arrangement 40 that includes the mounting substrate 41 and the capacitor 1A is mounted on the motherboard 45.

The mounting substrates 41 and 45 are spaced from each other in the height direction DH by the solder balls 47A and 47B, and the multilayer ceramic capacitor 1A is placed between the two substrates 41 and 45. A resin 48 is provided between the mounting substrates 41 and 45 to encapsulate (or seal) the multilayer ceramic capacitor 1A. The resin 48 is, for example, an epoxy resin. The resin 48 may be injected and cured between the mounting boards 41 and 45 after the mounting boards 41 and 45 are connected to each other by the solder balls 47A and 47B. The resin 48 covers the multilayer ceramic capacitor 1A, the solder layers 43A, 43B and the solder balls 47A, 47B, and adheres to the top surface 8T of the oxide layer 8.

Because the concave area 8A is formed in the central portion of the oxide layer 8, it is possible to reduce the stress applied to the central portion of the element body 2 and alleviate the load applied to the element body 2 during the mounting of the multilayer ceramic capacitor 1A on the substrate 41. Therefore, while suppressing a decrease in the rupture strength of the multilayer ceramic capacitor 1A, it is possible to reduce the height of the multilayer ceramic capacitor 1A. It is also possible to prevent wetting up of the solder during the mounting of the multilayer ceramic capacitor 1A on the substrate 41. Consequently, while realizing LSC mounting of the multilayer ceramic capacitor 1A, it is possible to suppress or prevent the cracking of the multilayer ceramic capacitor 1A when the multilayer ceramic capacitor 1A is mounted on the substrate 41.

Because the surface roughness Ra of the oxide layer 8 is equal to or greater than 0.20 μm, the adhesion between the oxide layer 8 and the resin 48 is enhanced. Therefore, it is possible to prevent formation of a gap, into which moisture or water would enter, between the multilayer ceramic capacitor 1A and the resin 48. This improves the reliability of the multilayer ceramic capacitor 1A that is sealed with the resin 48.

Because the multilayer ceramic capacitor 1A is mounted on the back face 41b of the mounting substrate 41, the multilayer ceramic capacitor 1A is placed on the opposite face of the mounting substrate 41 when looked at from the semiconductor chip(s) which is mounted on the outer face 41a of the mounting substrate 41. Thus, it is possible to mount the multilayer ceramic capacitor 1A in close proximity to the semiconductor chip(s) mounted on the outer face 41a of the mounting substrate 41, thereby effectively eliminating the noises added to the semiconductor chip(s).

If the height of the multilayer ceramic capacitor 1A is 150 μm or less, the multilayer ceramic capacitor 1A is received in the spacing between the mounting boards 41 and 45, which are connected to each other via the solder balls 47A and 47B. Thus, it is possible to place the multilayer ceramic capacitor 1A on the inner face 41b of the mounting substrate 41 whereas the semiconductor chips are placed on the opposite face (outer face) 41a of the mounting substrate 41.

Figure 6A:
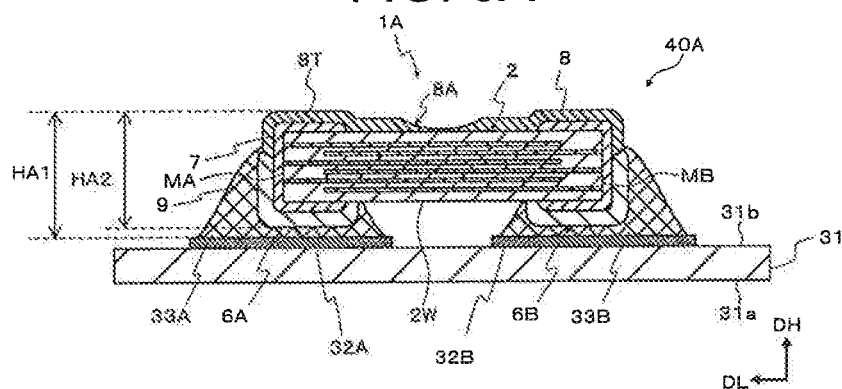
FIG. 6A is a cross-sectional view showing the relationship between the chip thickness and the height of the multilayer ceramic capacitor of FIG. 2A after mounting.

FIG. 6A is a cross-sectional view showing the relation between the chip thickness HA2 of the multilayer ceramic capacitor 1A (FIG. 2A) and the height HA1 of the multilayer ceramic capacitor 1A after mounting the multilayer ceramic capacitor 1A on a substrate 31. The height HA1 of the multilayer ceramic capacitor 1A after mounting is a total height of the capacitor 1A and a solder layer 33A. The substrate 31 has a lower surface 31a and an upper surface 31b. A combination of the substrate 31 and the multilayer ceramic capacitor 1A may be referred to as a substrate arrangement 40A. The chip thickness HA2 is equal to the height H1 in FIG. 2A. FIG. 6B is a cross-sectional view showing the relation between the chip thickness HB2 of a comparative multilayer ceramic capacitor 1B and the height HB1 of the multilayer ceramic capacitor 1B after mounting the multilayer ceramic capacitor 1B on the substrate 31. A combination of the substrate 31 and the multilayer ceramic capacitor 1B may be referred to as a substrate arrangement 40B.

As shown in FIG. 6A, land electrodes 32A and 32B are formed on the upper surface 31b of the substrate 31. The multilayer ceramic capacitor 1A is connected to the land electrodes 32A and 32B via the solder layers 33A and 33B respectively attached to the plating layers 9 of the external electrodes 6A and 6B. The height HA1 of the multilayer ceramic capacitor 1A after mounting is the vertical distance from the upper surface of the land electrode 32A to the upper surface 8T of the oxide layer 8. The thickness HA2 of the multilayer ceramic capacitor 1A is the vertical distance from the lower surface of the outer electrode 6A to the upper surface 8T of the oxide layer 8.

Figure 6B:
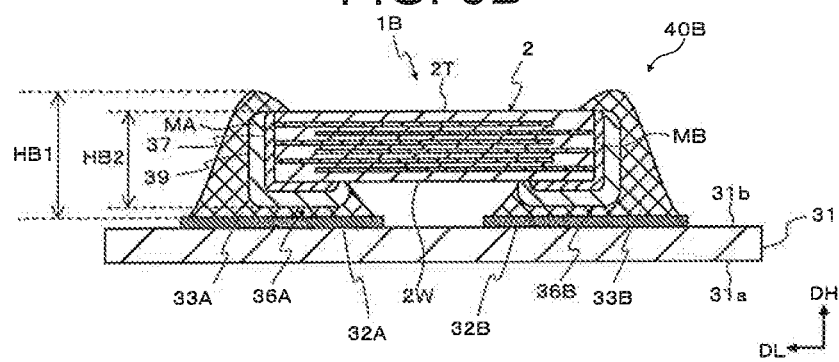
FIG. 6B is a cross-sectional view showing the relationship between the chip thickness and the height of a comparative capacitor after mounting.

As shown in FIG. 6B, the multilayer ceramic capacitor 1B includes an element body 2 and external electrodes 36A and 36B. Each of the external electrodes 36A and 36B includes a base layer 37 formed on the element body 2 and a plating layer 39 formed on the base layer 37. The external electrodes 36A and 36B differ from the external electrodes 6A and 6B shown in FIG. 6A in that the base layers 7 of the external electrodes 6A and 6B are formed on the upper surface 2T of the element body 2 whereas the base layers 37 of the external electrodes 36A and 36B are not formed on the upper surface 2T of the element body 2. The left base layer 37 covers the entire left end face MA of the element body 2 and the right base layer 37 covers the entire right end face MB of the element body 2. The plating layer 39 is formed over each of the base layers 37 such that the plating layer 39 extends from the lower surface 2W of the element body 2 to the end surface MA, MB of the element body 2.

The multilayer ceramic capacitor 1B is connected to the land electrodes 32A and 32B via the solder layers 33A and 33B respectively attached to the plating layers 39 of the external electrodes 36A and 36B. Since the left plating layer 39 is formed on the left base layer 37 formed on the left end face MA of the element body 2 and the right plating layer 39 is formed on the right base layer 37 formed on the right end face MB of the element body 2, the solder layer 33A is wetted up along the left face of the left plating layer 37 and protrudes beyond the upper surface 2T of the multilayer ceramic capacitor 1B and the solder layer 33B is wetted up along the right face of the right plating layer 39 and protrudes beyond the upper surface 2T of the multilayer ceramic capacitor 1B. Therefore, the height HB1 of the multilayer ceramic capacitor 1B after mounting is a vertical distance from the upper surface of the land electrode 32A to the uppermost point of the solder layer 33A. The multilayer ceramic capacitor 1B does not have the oxide layer 8 on the upper surface 2T of the element body 2 and on the external electrodes 36A and 36B. Therefore, the thickness HB2 of the multilayer ceramic capacitor 1B is the vertical distance from the lower surface of the outer electrode 36A to the upper surface 2T of the element body 2.

If the multilayer ceramic capacitor 1B of FIG. 6B is mounted on the mounting board 41 of FIG. 5 with the solder layers 33A and 33B and sealed by the resin 48, the resin 48 extends in close contact with the upper surfaces of the solder layers 33A and 33B and the upper surface 2T of the element body 2 of the multilayer ceramic capacitor 1B. This configuration has a possibility that a gap is left between the multilayer ceramic capacitor 1B and the resin 48 (between the top surface 2T and the resin 48, and/or between the solder layers 33A and 33B and the resin 48). This reduces the reliability of the multilayer ceramic capacitor 1B sealed with the resin 48. Furthermore, since the solder layers 33A and 33B protrude upward beyond the upper surface 2T of the multilayer ceramic capacitor 1B, the height HB1 of the capacitor 1B after mounting is greater than the height HA1 of the capacitor 1A after mounting. This may cause a problem, i.e., it may not be possible to place the multilayer ceramic capacitor 1B in the spacing between the two boards 41 and 45 that are connected to each other via the solder balls 47A and 47B.

Third Embodiment

Figure 7A:
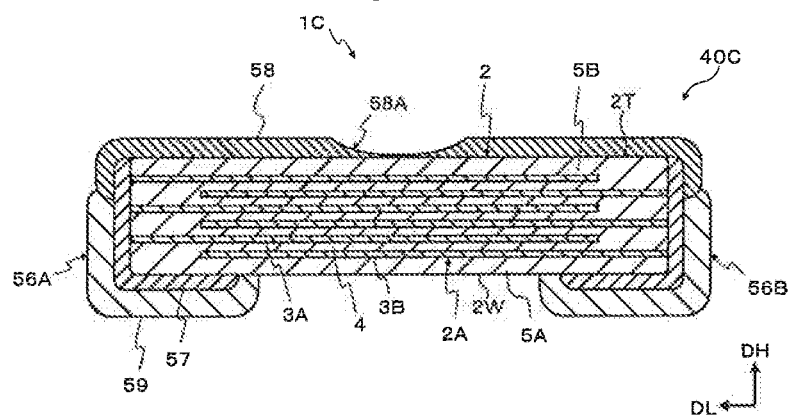
FIG. 7A is a cross-sectional view similar to FIG. 2A and shows a multilayer ceramic capacitor according to a third embodiment of the present invention, taken in the length direction of the capacitor.
Figure 7B:
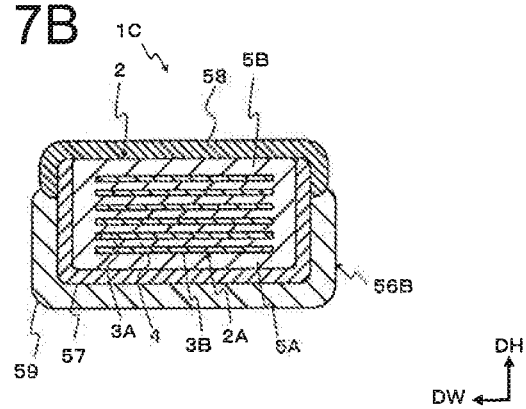
FIG. 7B is a cross-sectional view similar to FIG. 2B and shows the multilayer ceramic capacitor according to the third embodiment.
Figure 7C:
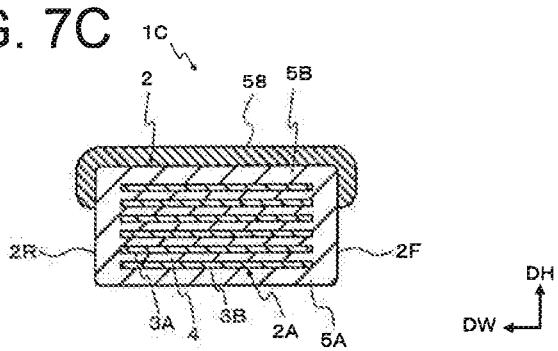
FIG. 7C is a cross-sectional view similar to FIG. 2C and shows the multilayer ceramic capacitor according to the third embodiment.

FIG. 7A is similar to FIG. 2A and shows a cross-sectional view of a multilayer ceramic capacitor 1C according to a third embodiment of the present invention, taken along the length direction DL of the multilayer ceramic capacitor 1C. FIG. 7B is similar to FIG. 2B and shows a cross-sectional view of the multilayer ceramic capacitor 1C, taken in the width direction DW at the position of the external electrode. FIG. 7C is similar to FIG. 2C and shows a cross-sectional view of the multilayer ceramic capacitor 1C, taken in the width direction at the position of the element body 2. Same or similar reference numerals are used to designate same or similar parts in the first and third embodiments.

As shown in FIGS. 7A to 7C, the multilayer ceramic capacitor 1C includes an element body 2, a left external electrode 56A, a right external electrode 56B and an oxide layer 58. Each of the external electrodes 56A and 56B includes a base layer 57 formed on the element body 2 and a plating layer 59 formed on the base layer 57.

The external electrode 56A, 56B differs from the external electrode 6A, 6B of FIG. 2A in that the base layer 7 of the external electrode 6A, 6B is formed on the upper surface 2T of the element body 2 whereas the base layer 57 of the external electrode 56A, 56Bt is not formed on the upper surface 2T of the element body 2. To prevent the base layer 57 from being formed on the upper surface 2T, the base layer 7 on the upper surface 2T of the element body 2 in FIG. 2A may be removed by anisotropic etching or by mechanical grinding, for example. The oxide layer 58 is formed on the left base layer 57, the element body 2 and the right base layer 57. For example, the oxide layer 58 may be formed on the entire upper surface 2T of the element body 2. Similar to the configuration shown in FIG. 2A, the oxide layer 58 is not formed on the plating layers 59. The base layers 57, the plating layers 59, and the oxide layer 58 may be made in the same manner as the base layers 7, the plating layers 9 and the oxide layer 8 shown in in FIG. 2A in other aspects. For example, the thickness T3 of the base layer 7 is equal to the thickness of the base layer 57.

As understood from comparison between FIGS. 7A and 2A, the underlayers 57 are not formed on the top surface 2T of the element body 2 in FIG. 7A, and therefore it is possible to reduce the height of the multilayer ceramic capacitor 1C by the thickness T3 of the underlayer 57.

Fourth Embodiment

Figure 8:
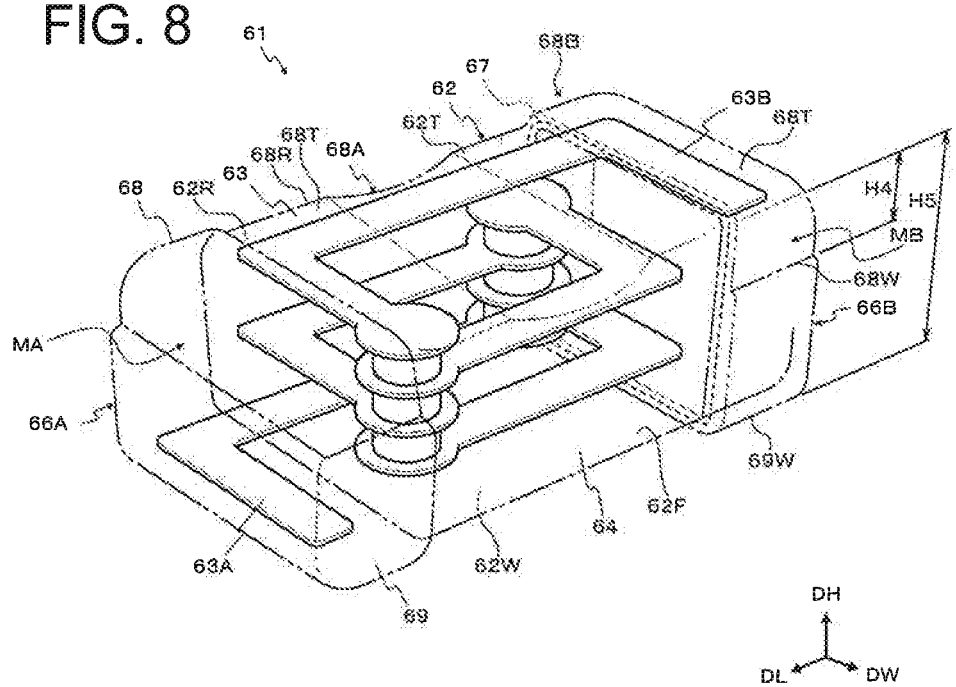
FIG. 8 is a perspective view showing a configuration example of a ceramic electronic component according to a fourth embodiment of the present invention.

Referring now to FIG. 8, a fourth embodiment of the invention will be described. FIG. 8 is a perspective view of an exemplary ceramic electronic component of the fourth embodiment. In the fourth embodiment, a chip inductor 61 will be described as an example of the ceramic electronic component. The chip inductor 61 may be mounted on the substrate 41 shown in FIG. 5.

As shown in FIG. 8, the chip inductor 61 includes an element body 62, external electrodes 66A and 66B and an oxide layer 68. The element body 62 has a coil pattern 63, internal electrode layers 63A and 63B, and a magnetic material 64. The magnetic material 64 is used as a dielectric to insulate the inner electrode layers 63A and 63B. The element body 62 may have a generally rectangular parallelepiped shape. Each of the external electrodes 66A and 66B has a structure similar to the external electrode 6A, 6B of the first embodiment. Specifically, each of the external electrodes 66A and 66B has a base layer 67 formed on the element body 62 and a plating layer 69 formed on the base layer 67. The base layer 67 may be made from a combination of a metal and a co-material.

The external electrodes 66A and 66B are formed on the left end face MA and the right end face MB of the element body 62, respectively, such that the external electrodes 66A and 66B are separated from each other in the longitudinal directions DL of the element body 62. The left external electrode 66A is formed on the left end face MA of the element body 62, and extends onto the front face 62F, the rear face 62R and the bottom face 62W of the element body 62. The right external electrode 66B is formed on the right end face MB of the element body 62, and extends onto the front face 62F, the rear face 62R and the bottom face 62W of the element body 62.

The coil pattern 63 and the internal electrode layers 63A and 63B are generally covered with the magnetic material 64. It should be noted, however, that the left end of the internal electrode layer 63A extends out of the magnetic material 64 from the left end face MA of the element body 62 and connected to the external electrode 66A. Similarly, the right end of the internal electrode layer 63B extends out of the magnetic material 64 from the opposite end face (right end face MB) of the element body 62 and is connected to the external electrode 66B.

The materials of the coil pattern 63 and the inner electrode layers 63A and 63B may be a metal such as Cu, Ni, Ti, Ag, Au, Pt, Pd, Ta or W, for example, or an alloy containing these metals. The magnetic material 64 is, for example, ferrite.

Each of the external electrodes 66A and 66B includes the underlayer 67 and the plating layer 69. The left and right underlayers 67 are formed on the left end face MA and the right end face MB of the element body 62, respectively, such that the left underlayer 67 is separated from the right underlayer 67 in the longitudinal direction DL of the element body 62. The left underlayer 67 is formed on the left end face MA of the element body 62 and extends onto the front face 62F, the rear face 62R, the top face 62T and the bottom face 62W of the element body 62. The right underlayer 67 is formed on the right end face MB of the element body 62 and extends onto the front face 62F, the rear face 62R, the top face 62T and the bottom face 62W of the element body 62. The left underlayer 67 is connected to the left inner electrode 63A and the right underlayer 67 is connected to the right inner electrode 63B.

The left plating layer 69 is formed on the left face of the left underlayer 67 and extends onto the front face, the rear face and the bottom face of the left underlayer 67. The right plating layer 69 is formed on the right face of the left underlayer 67 and extends onto the front face, the rear face and the bottom face of the left underlayer 67. The plating layers 69 are not formed on the upper faces of the underlayers 67. The upper end of the left plating layer 69 on the left face of the left underlayer 67 is lower than the upper surface 62T of the element body 62. The upper end of the right plating layer 69 on the right face of the right underlayer 67 is lower than the upper surface 62T of the element body 62. The underlayer 67 may contain a co-material in which a metal is mixed. The co-material is, for example, a ferrite component which is a main component of the magnetic material 64.

The oxide layer 68 is formed on the top face of the left underlayer 67, the top face 62T of the element body 62 and the top face of the right underlayer 67. The oxide layer 68 also extends on the front face 62F and the rear face 62R of the element body 62. The oxide layer 68 also extends on the front face, the rear face and the left face of the left underlayer 67 and the front face, the rear face and the right face of the right underlayer 67. The oxide layer 68 is not formed on the lower surface 62W of the element body 62, the lower surface of the left underlayer 67 and the lower surface of the right underlayer 67. The lower edge 68W of the oxide layer 68 is present on the front face 62F and the rear face 62R of the element body 62, on the left face, the front face and the rear face of the left underlayer 67 and on the right face, the front face and the rear face of the right underlayer 67. Thus, the lower edge 68W of the oxide layer 68 is higher than the lower surface 62W of the element body 62.

The lower edge 68W of the oxide layer 68 contacts the upper edge of the left plating layer 69 on the front face, the left face and the rear face of the left underlayer 67 and contacts the upper edge of the right plating layer 69 on the front face, the right face and the rear face of the right underlayer 67. The height H4 of the oxide layer 68, which is measured from the top surface 68T of the oxide layer 68 to the lower edge 68W of the oxide layer 68, may be 10 μm or more, and may not exceed a half of the height H5 of the chip inductor 61. The height H5 is measured from the top surface 68T of the oxide layer 68 to the bottom surface 69W of the plating layer 69. The lower edge 68W and its vicinity of the oxide layer 68 on the left base layer 67 are covered with the left plating layer 69. The lower edge 68W of the oxide layer 68 on the left base layer 67 may be wedged between the left base layer 67 and the left plating layer 69. Similarly, the lower edge 68W and its vicinity of the oxide layer 68 on the right base layer 67 are covered with the right plating layer 69. The lower edge 68W of the oxide layer 68 on the right base layer 67 may be wedged between the right base layer 67 and the right plating layer 69. The surface roughness Ra of the oxide layer 68 may be equal to or greater than 0.20 μm. Similar to the configuration shown in FIG. 2A, the oxide layer 68 bends downward from the top surfaces of the base layers 67. Thus, the height H4 of the oxide layer 68 may be referred to as an amount of wrapping-around or downward bending of the oxide layer 68.

The oxide layer 68 has a thinner portion 68A in a certain area of the oxide layer 68 on the upper surface 62T of the element body 62. In the illustrated embodiment, the thinner portion 68A is formed in a center area of the top surface 68T of the oxide layer 68. The thickness of the oxide layer 68 is, therefore, greater in outer areas 68B than in the center area 68A. As shown in FIG. 8, the thinner portion 68A extends in the width direction DW. It should be noted that the thinner portion 68A may also be formed in a center area of the front face 68F of the oxide layer 68 on the element body 62 and/or the rear face 68R of the oxide layer 68 on the element body 62. In other words, the thinner portion 68A extending in the width direction DW may also extend downward along the front face 62F and/or the rear face 62R of the element body 62. The thinner portion 68A is a concave portion (recess) of the oxide layer 68. The thinner portion 68A may have a curved surface. For example, the concave portion 68A formed in the center area of the oxide layer 68 may have an arcuate shape. The thickness T1 (FIG. 2A) of the oxide layer 68 is preferably between 1 μm and 15 μm. It is preferable that the thickness T2 (FIG. 2A) of the thinner portion 68A of the oxide layer 68 is 5% or more thinner than the thickness T1 of the end portion of the oxide layer 68. For example, the thickness T2 of the central portion 68A of the oxide layer 68 may be about 2 μm, and the thickness T1 of the end portion of the oxide layer 68 may be between 5 μm and 15 μm.

The composition of the oxide layer 68 may be the same as the composition of the magnetic material 64. For example, the material of the oxide layer 68 is ferrite. The material of the oxide layer 68 may be iron oxide or chromium oxide.

The size of the chip inductor 61 may satisfy the relation of length>width>height, or the relation of length>width=height. In order to reduce the height of the chip inductor 61, the height H5 of the chip inductor 61 is preferably 150 μm or less.

Since the concave area 68A is formed in the central portion of the oxide layer 68, it is possible to reduce the stress applied to the central portion of the element body 62 and alleviate the load applied to the element body 62 during the mounting of the chip conductor 61 on the substrate 41 (FIG. 5). Therefore, while suppressing a decrease in the rupture strength of the chip inductor 61, it is possible to reduce the height of the chip inductor 61. It is also possible to prevent wetting up of the solder during the mounting of the chip inductor 61 on the substrate 41. Consequently, while realizing LSC mounting of the chip inductor 61, it is possible to suppress or prevent the cracking of the chip inductor 61 when the chip inductor 61 is mounted on the substrate 41.

EXAMPLES

Actual examples of the multilayer ceramic capacitor 1A of FIG. 2A will now be described. Seventy-seven examples of the multilayer ceramic capacitor 1A were prepared and evaluated. Each of the multilayer ceramic capacitor 1A had a JIS-compliant 063 shape and a height of 100 μm. To confirm the superiority of the multilayer ceramic capacitor 1A, seventy-seven comparative examples were also prepared.

First, preparation of the actual examples of the multilayer ceramic capacitor 1A will be described below. A plurality of green sheets 24 were prepared using a high dielectric material such as barium titanate. The thickness of each green sheet 24 was 1 μm. Then, the internal electrode patterns 23 were formed on the green sheets 24 by a printing method. The green sheets 24, on which the internal electrode patterns 23A, 23B were formed, cover sheets 25A, 25B and a green sheet 24A were stacked to obtain a block 25 of these sheets. The green sheet thickness and the number of stacked green sheets were decided such that the thickness H2 of the resulting multilayer ceramic capacitor 1A would become 70 μm in consideration of the thickness of the underlying layer 7, the thickness of the plating layer 9 and shrinkage during the sintering. The block 25 was cut at predetermined positions to produce a plurality of element bodies 2. A conductive paste for the underlayer was applied to both ends (MA, MB) and their vicinities of each of the element bodies 2 by a dipping method. Both ends of the element body 2 may include the end faces MA and MB of the element body 2 and neighboring areas on the top surface 2T, the bottom surface 2W, the front surface 2F and the rear surface 2R of the element body 2.

Next, an oxide paste was applied onto the top surface 2T and neighboring areas of adjacent surfaces of each of the element bodies 2, onto which the conductive paste for the base layer was applied, by a dipping process. The oxide paste contained barium titanate, a binder, and a solvent. A depth of dipping in the dipping process was controlled such that an amount of downward bending of the oxide paste (i.e., the height H1 of the oxide paste) would become 30 μm from the upper surface 2T of the multilayer ceramic capacitor 1A. It should be noted that although the height H1 of the oxide paste was 30 μm in this example, the height H1 may be any value between 10 μm and 35 μm. 35 μm is a half of the thickness of the multilayer ceramic capacitor 1A (70 μm). An amount of barium titanate contained in the oxide paste was adjusted to between 20% and 70% so that the surface roughness Ra of the oxide layer 8 became 0.20 μm or more after the sintering. The viscosity of the oxide paste was adjusted so that an average value of the total thickness of the element body 2 and the central portion 8A of the oxide layer 8 after the sintering became about 72 μm and the height difference between the end portion 8B and the center portion 8A became 5 m±1 μm.

The sintered bodies were produced by sintering the element bodies 2, which were coated with the oxide paste and the conductive paste for the underlayer, at 1000 degrees C. to 1400 degrees C. Then, the sintered bodies underwent an electroplating to produce multilayer ceramic capacitors 1A. The rupture test was applied to the multilayer ceramic capacitors 1A to obtain values of the rupture strength of the capacitors 1A. In evaluating the rupture strength, a three-point bending test was performed to each of the capacitors 1A by applying a force to the outer electrodes 6A and 6B with the oxide layer 8 facing downward. The comparative examples were prepared in the same manner except for the processes of forming the oxide layer 8 and the plating layers 9. Specifically, each of the comparative examples did not have the oxide layer 8, and the plating layers 9 were formed over the five faces (the left face 7P, the top face 7T, the bottom face 7W, the front face 7F and the rear face 7R) of the left underlayer 7 and the five faces (the right face 7Q, the top face 7T, the bottom face 7W, the front face 7F and the rear face 7R) of the right underlayer 7.

Figure 9:
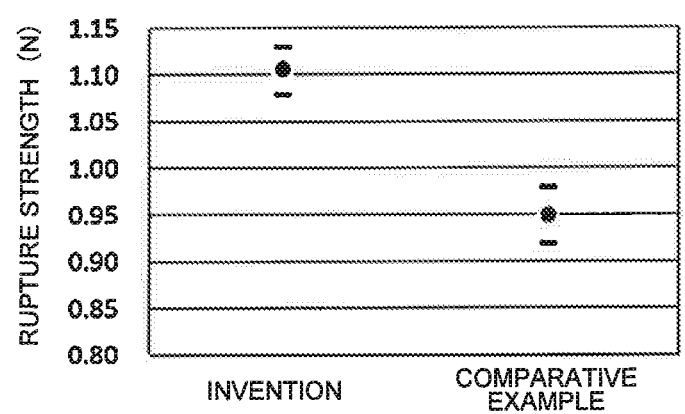
FIG. 9 is a diagram showing comparison between a rupture strength of the multilayer ceramic capacitor of FIG. 2A and the rupture strength of a comparative example.

FIG. 9 shows the rupture strength of the multilayer ceramic capacitors 1A of FIG. 2A and the rupture strength of the comparative examples.

In FIG. 9, the values of the rupture strength of the comparative examples are seen in the range from 0.92N to 0.98N, and the average value was 0.95N. On the other hand, the values of the rupture strength of the examples of the invention (multilayer ceramic capacitors 1A of FIG. 2A) are seen in range from 1.08N to 1.13N, and the average value was 1.10N. From this evaluation, it was confirmed that forming the oxide layer 8, which has the concave area 8A in the central portion of the oxide layer 8, over the top surface 2T of the element body 2 can increase or enhance the rupture strength as compared with the multilayer ceramic capacitor having no oxide layer 8.

It will be apparent to those skilled in the art that various modifications and variations can be made in the present invention without departing from the spirit or scope of the invention. Thus, it is intended that the present invention encompasses modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. A ceramic electronic component comprising:
    an element body including a dielectric and internal electrodes, the element body having a top face, a bottom face, and a pair of end faces;
    a pair of external electrodes respectively formed to cover, at least partially, the end faces of the element body, each of the external electrodes including a base layer and a plating layer, the base layer containing metal and having a lower part formed on the bottom face of the element body and an end part formed on a corresponding one of the end faces of the element body and being connected to one or more of the internal electrodes that are exposed at the corresponding end face, the plating layer being formed on at least the lower part of the corresponding base layer; and
    an oxide layer formed on a predetermined area of the top face of the element body, the oxide layer having a thinner portion in an area on the top face of the element body that is spaced from the end faces of the element body, the oxide layer being absent on the bottom face of the element body.

2. The ceramic electronic component according to claim 1,
    wherein in each of the external electrodes, the plating layer continuously covers the lower part as well as the end part of the base layer, and
    wherein the oxide layer continuously covers the top face of the element body and at least portions of the respective end parts of the base layers that are respectively on the end faces of the element body.

3. The ceramic electronic component according to claim 1, wherein the thinner portion of the oxide layer is a concave portion formed in a central area of the oxide layer on the top face of the element body.

4. The ceramic electronic component according to claim 3, wherein the concave portion has an arcuate shape.

5. The ceramic electronic component according to claim 3, wherein the concave portion is located at a position spaced from the external electrodes.

6. The ceramic electronic component according to claim 1, wherein the thinner portion of the oxide layer is 5% or more thinner than portions of the oxide layer closer to the end faces of the element body.

7. The ceramic electronic component according to claim 1, wherein the oxide layer meets the plating layers on the respective end faces of the element body.

8. The ceramic electronic component according to claim 1, wherein the plating layer is absent on or above the top face of the element body, and the oxide layer is also formed on the base layers formed on the end faces of the element body such that a portion of the oxide layer is covered with the plating layer on the base layer on each of the end faces.

9. The ceramic electronic component according to claim 1, wherein a thickness of the ceramic electronic component, which is measured from a lower surface of the external electrodes to an upper surface of the oxide layer, is 150 μm or less.

10. The ceramic electronic component according to claim 1, wherein a main component of the oxide layer is the same as a main component of the dielectric.

11. The ceramic electronic component according to claim 1, wherein the oxide layer is made from an oxide ceramic.

12. The ceramic electronic component according to claim 1, wherein the oxide layer contains one of barium titanate, strontium titanate, calcium titanate, magnesium titanate, barium strontium titanate, barium calcium titanate, calcium zirconate, barium zirconate, calcium zirconate titanate, titanium oxide, silicon oxide and aluminum oxide.

13. The ceramic electronic component according to claim 1, wherein the base layer is also formed on a portion of the top face of the element body, and the oxide layer is formed on the base layer formed on the portion of the top face of the element body and on a remaining area of the top face of the element body.

14. The ceramic electronic component according to claim 1, wherein the oxide layer is absent on the plating layer.

15. The ceramic electronic component according to claim 1,
wherein the internal electrodes include at least one first internal electrode layer and at least one second internal electrode layer such that the at least one first internal electrode layer and the at least one second internal electrode layer are alternately laminated via at least one dielectric layer that is the dielectric,
wherein the at least one first internal electrode layer is connected to one of the pair of external electrodes, and
wherein the at least one second internal electrode layer is connected to another of the pair of external electrodes.

16. A device comprising:
a mounting substrate; and
the ceramic electronic component as set forth in claim 1, mounted on the mounting substrate via solder layers, the solder layers being adhered to the plating layers of the external electrodes, respectively,
wherein the solder layers are wetted up onto the respective external electrode without reaching a top surface of the oxide layer.

17. The device according to claim 16, further comprising:
at least one solder ball provided on a predetermined surface of the mounting substrate, and
wherein the ceramic electronic component is mounted on the predetermined surface of the mounting substrate.

18. The device according to claim 17, further comprising another mounting substrate, wherein the another mounting substrate is connected to the mounting substrate by the at least one solder ball such that spacing is provided between the another mounting substrate and the mounting substrate and the ceramic electronic component is received in the spacing between the another mounting substrate and the mounting substrate.

19. A method of manufacturing a ceramic electronic component, the method comprising: forming an element body that includes a dielectric and internal electrodes, the element body having a top face, a bottom face, and a pair of end faces; applying a base material for base layers of external electrodes onto the bottom face and the end faces of the element body; applying an oxide material for an oxide layer onto the top face of the element body and onto portions of the base material that are on the end faces; thereafter, sintering the base material and the oxide material to form the base layers of the external electrodes and the oxide layer, the base layer of each of the external electrodes having a lower part formed on the bottom face of the element body and an end part formed on one of the end faces of the element body and being connected to one or more of the internal electrodes, the oxide layer being formed on the top face of the element body and on at least portions of the end part of the base layers on the end faces, the oxide layer having a thinner portion in an area on the top face of the element body spaced from the end faces of the element body, the oxide layer being absent on the bottom face of the element body; and forming plating layers on the base layers, respectively, each of the plating layers being formed on the lower part and the side part of one of the base layers.

20. The method of manufacturing a ceramic electronic component according to claim 19, wherein a thickness of the oxide layer and a lower edge of the oxide layer on each of the end faces of the element body are set such that when the ceramic electronic component is mounted on a substrate by solders, an upper end of the solders that wet up on the respective plating layers on the end faces of the element body is positioned lower than a top surface of the oxide layer.

* * * * *